(12) United States Patent
Solhage et al.

(10) Patent No.: US 11,072,754 B2
(45) Date of Patent: Jul. 27, 2021

(54) METHOD FOR PRODUCTION OF AT LEAST ONE TANNIC PRODUCT AND A BARK PRODUCT WITH ENHANCED FUEL VALUE

(71) Applicant: Södra Skogsägarna ekonomisk förening, Växjö (SE)

(72) Inventors: Fredrik Solhage, Borås (SE); Narcis Mesic, Varberg (SE)

(73) Assignee: Södra Skogsägarna Ekonomisk Förening

(*) Notice: Subject to any disclaimer, the term of this patent is extended or adjusted under 35 U.S.C. 154(b) by 0 days.

(21) Appl. No.: 16/645,010

(22) PCT Filed: Sep. 11, 2018

(86) PCT No.: PCT/SE2018/050907
§ 371 (c)(1),
(2) Date: Mar. 6, 2020

(87) PCT Pub. No.: WO2019/054916
PCT Pub. Date: Mar. 21, 2019

(65) Prior Publication Data
US 2020/0255758 A1 Aug. 13, 2020

(30) Foreign Application Priority Data

Sep. 12, 2017 (EP) .................... 17190555

(51) Int. Cl.
*C10L 5/44* (2006.01)
*C08L 99/00* (2006.01)
*C08H 7/00* (2011.01)

(52) U.S. Cl.
CPC .............. *C10L 5/442* (2013.01); *C08H 6/00* (2013.01); *C08L 99/00* (2013.01); *C10L 2200/0469* (2013.01); *C10L 2290/08* (2013.01)

(58) Field of Classification Search
CPC ... C08H 6/00; C08L 99/00; C10L 2200/0469; C10L 2290/08; C10L 5/442; Y02E 50/10; Y02E 50/30
See application file for complete search history.

(56) References Cited

U.S. PATENT DOCUMENTS 6,589,460 B1 7/2003 Shen
2009/0077871 A1* 3/2009 Gebert .................... C10L 5/361
44/590

FOREIGN PATENT DOCUMENTS

AU        629029 B2   3/1991
CN    103865653 A  *  6/2014
(Continued)

OTHER PUBLICATIONS

Rodrigo Andrés Sarria-Villa, "Research Article"; filed Mar. 2018 (Year: 2018).*

(Continued)

*Primary Examiner* — Ellen M McAvoy
*Assistant Examiner* — Chantel L Graham
(74) *Attorney, Agent, or Firm* — Tarolli, Sundheim, Covell & Tummino LLP

(57) ABSTRACT

A method for production of at least one tannic product and a bark product having enhanced fuel value is disclosed. The method comprises disintegrating bark; compressing the disintegrated bark to recover a first liquid extract comprising tannic substances; impregnating the compressed bark with a first aqueous impregnation composition at a pH below 7, and at temperature within the range of 45-80° C.; dewatering the impregnated bark to recover a second liquid extract comprising tannic substances and a dewatered bark product; recirculating at least a part of the second liquid extract to the impregnation step, wherein the first aqueous impregnation composition comprises a mixture of said recirculated part of the second liquid extract and optionally fresh water; option- (Continued)

ally combining said first liquid extract with the non-recirculated part of said second liquid extract; and adding sulphite salt to said first liquid extract and to said non-recirculated part of said second liquid extract.

20 Claims, 12 Drawing Sheets

(56) References Cited

FOREIGN PATENT DOCUMENTS

| CN | 103865653 | B |   | 4/2016  |          |
|----|-----------|---|---|---------|----------|
| GB | 191314405 | A |   | 6/1914  |          |
| GB | 542769    | A |   | 1/1942  |          |
| GB | 2063856   | A | * | 6/1981  | C07C 27/34 |
| GB | 2063856   | A |   | 6/1981  |          |
| RU | 2122033   | C1 |  | 11/1998 |          |

OTHER PUBLICATIONS

Jutakridsada P. et al., "Usage of Eucalyptus globulus bark as a raw material for natural antioxidant and fuel source" In: Clean Technologies and Environmental Policy, Sep. 17, 2016, vol. 19, No. 3, pp. 907-915, ISSN: 1618-954X; whole document.

Devappa R.K, et al, "Potential of Poplar Bark Phytochemicals as Value-Added Co-products from the Wood and Cellulosic Bioethanol Industry" In: BioEnergy Research, Jan. 22, 2015, vol. 8, No. 3, pp. 1235-1251, ISSN 1939-1234.

* cited by examiner

METHOD FOR PRODUCTION OF AT LEAST ONE TANNIC PRODUCT AND A BARK PRODUCT WITH ENHANCED FUEL VALUE

RELATED APPLICATIONS

[0001] The present invention is a U.S. National Stage under 35 USC 371 patent application, claiming priority to Serial No. PCT/SE2018/050907, filed on 11 Sep. 2018; which claims priority of EP 17190555.7, filed on 12 Sep. 2017, the entirety of both of which are incorporated herein by reference.

FIELD OF THE INVENTION

The present invention relates to a method for production of at least one tannic product and a bark product with enhanced fuel value. Also disclosed is the at least one tannic product as well as the bark product having enhanced fuel value, which are obtained with the disclosed method.

BACKGROUND

Within saw milling and pulp mill operations, bark is often a by-product which mainly are used for combustion to produce energy within the plant or within a local district heating plant.

While being a by-product having a high fuel value, bark is also a by-product which is rich of various components. It is known that extraction of such component with solvents such as water, aqueous solvents and lower alcohols can give rise to substances usually called tannin(s) which can be used as adhesive, a binder, a drug or the like, such processes are for example disclosed in U.S. Pat. No. 5,238,680, EP1071842 and GB2063856. Other components are also known to be extracted from wood fines, e.g. arabinogalactan, which is used in a wide range of commercial applications, e.g. printing, mining, biological research and food industry. U.S. Pat. No. 5,756,098 discloses one method for extraction of arabinogalactan from wood fines.

When extracting various components from bark and other wood fines, it is also important to make sure that the bark or other wood fines still is usable for combustion to produce energy. Thus, the extraction method should not decrease the fuel value of the bark.

SUMMARY

An object of the invention is to provide a method of production which extracts a tannic product from bark and at the same time enhances the fuel value of the bark coming out of the method of production.

Another object of the invention is to provide at least one tannic product which is stable and provides good tanning of hides to obtain leather product of good quality and colour.

Another object of the invention is to provide a bark product with enhanced fuel value.

According to a first aspect of the invention, these and other objects are achieved, in full or at least in part, by a method for production of at least one tannic product and a bark product having enhanced fuel value comprising the steps of: (a) disintegrating bark to an average bark particle size of 1-200 mm; (b) compressing the disintegrated bark to recover a first liquid extract comprising tannic substances; (c) impregnating the compressed bark with a first aqueous impregnation composition during 10-120 minutes, at a pH below 7, and at temperature within the range of 45-80° C.; (d) dewatering the impregnated bark to recover a second liquid extract comprising tannic substances and a dewatered bark product; (e) recirculating at least a part of the second liquid extract to the impregnation step, wherein the first aqueous impregnation composition comprises a mixture of said recirculated part of the second liquid extract and optionally fresh water; (f) optionally combining said first liquid extract with the non-recirculated part of said second liquid extract; and (g) adding a sulphite salt to said first liquid extract and to said non-recirculated part of said second liquid extract, or to the optionally combined first and second liquid extracts in a level of 1-25% by weight for providing a first tannic product and a second tannic product, or a combined tannic product.

With this method at least one tannic product having excellent tanning properties is provided and at the same time a bark product with enhanced fuel value is provided.

The process according to the invention may be a continuous process or a batch-wise process. According to one embodiment, the process is a continuous process.

In one embodiment, the inventive method comprises a further step of: (h) evaporating said first tannic product and said second tannic product or said combined tannic product from step (g) to a level of at least 10% dry weight, of at least 20% dry weight, of at least 30% dry weight, of at least 40% dry weight, or of at least 50% dry weight.

In another embodiment, the inventive method comprises an additional step of (i) drying said first tannic product and said second tannic product or said combined tannic product from step (g) or from step (h) for providing a dry powder product of said first tannic product and of said second tannic product or of said combined tannic product.

In one embodiment, said drying in step (i) is spray drying or freeze drying. In another embodiment said drying in step (i) is spray drying, and in a further embodiment said drying in step (i) is spray drying including agglomeration of particles.

In a further embodiment of the inventive method, more particular in step (g), a sulphite salt is added to said first liquid extract and to said non-recirculated part of said second liquid extract, or to the optionally combined first and second liquid extracts within a range of 2-24% by weight, within a range of 4-22% by weight, within a range of 5-20% by weight, or within a range of 10-15% by weight.

In one embodiment, the combined first and second liquid extract comprises first to second liquid extract in a ratio within the range of 2:1-1:5, 1:1-1:4, or 1:2-1:3.

In yet a further embodiment of the method, the impregnation in step (c) is made during 15-60 minutes, or during 15-30 minutes.

In one embodiment of the inventive method, more particular in step (c), the first aqueous impregnation composition is added to said compressed bark in a weight ratio (bark:first aqueous impregnation composition) within the range of 1:3-1:10, or within the range of 1:4-1:8, or within the range of 1:4-1:6.

In one embodiment of the method, the temperature in step (c) is within the range of 50-70° C., or within the range of 55-65° C. under normal atmospheric pressure.

In another embodiment of the inventive method, the pH in step (c) is below 6.5, or below 6.

In a further embodiment of the inventive method, the recirculated second liquid extract is added to fresh water within a weight ratio range of (second extract:fresh water) 1:2-6:1, within a weight ratio range of 1:1-5:1, within a weight ratio range of 1.5:1-4:1, or within a weight ratio range of 2:1-3:1 to provide the first aqueous impregnation composition.

In yet another embodiment of the inventive method, said dewatered bark product from step (d) is treated further and is washed with an aqueous solution, preferably fresh water at a temperature of 60-80° C., and thereafter dewatered to produce a third liquid extract and a washed and dewatered bark product. The third liquid extract is recirculated to be combined with the recirculated second liquid extract and optionally fresh water to form said first aqueous impregnation composition for step (c).

In an embodiment where a third liquid extract is recirculated to be combined with the recirculated second liquid extract, the third liquid extracts replaces a substantially part of the fresh water in the first aqueous impregnation composition. In one embodiment the proportions of second liquid extract to third liquid extract combined with fresh water is within the weight ratio range of 1:4 to 20:1, 1:2 to 10:1, 1:1 to 5:1, 1.5:1 to 4:1, or 2:1 to 3:1.

In one embodiment of the inventive method, the bark, in step (a), is disintegrated to an average bark particle size within the range of 2-200 mm, within the range of 5-150 mm, or within the range of 10-100 mm. The average bark particle size is determined in accordance with standard SS-EN ISO 17827-1:2016.

In another embodiment of the inventive method, the disintegrated bark from step (a) has a dry content of 15-50%, 20-45%, or 25-35%.

In one embodiment of the inventive method, the bark may be from any tannin containing tree bark species, such as acacia, quebracho, pine, larch or spruce, but especially from softwood species like spruce, larch and pine, especially spruce.

In yet another embodiment of the inventive method, the bark is compressed in step (b) to a dry content of 40-60%, 45-55%, or 45-50%.

In one embodiment, the inventive method may be open, co-current, counter-current or co- and countercurrent. In one embodiment the process with respect to the first liquid extract is open and with respect to second and third liquid extract is counter-current.

According to a second aspect of the invention, these and other objects are also achieved, in full or at least in part, by a tannic product obtained by the method according to the first aspect of the invention.

According to one embodiment of the second aspect of the invention, the tannic product obtained by the method from step (g) has a dry weight above 2%, above 4%, above 6%, or above 8%.

According to another embodiment of the second aspect of the invention, the tannic product obtained by the method from step (h) has a dry weight above 10%, above 20%, above 30%, above 40%, or above 50%.

According to a further embodiment of the second aspect of the invention, the tannic product obtained by the method from step (i) has a dry weight above 90%, above 95%, or above 97%.

According to one embodiment, the tannic product has an astringency of at least 1.0, more preferably at least 1.2, and most preferably at least 1.5.

According to a third aspect of the invention, these and other objects are also achieved, in full or at least in part, by a bark product obtained by the method according to the first aspect of the invention.

According to one embodiment, the bark product has an energy value of more than 93% of the original energy value of the raw material, preferably more than 95% of the original energy value of the raw material, and most preferably more than 97% of the original energy value of the raw material.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

As used herein, the term "tannic substance" and "tannic product" means a substance or a product having a composition that give rise to tanning of hides in a tanning process to produce leather.

As used herein, the term "tannic product(s)" refers to a tannic product obtained from said $1^{st}$ liquid extract, said $2^{nd}$ liquid extract or a combination of said $1^{st}$ and said $2^{nd}$ liquid extracts.

As used herein, the term "sulphite salt" refers to a salt of sulphite, bisulphite or metabisulphite, and is chosen from the group comprising sodium sulphite, sodium bisulphite, sodium metabisulphite, potassium sulphite, potassium bisulphite, and potassium metabisulphite.

As used herein, the term "a bark product with enhanced fuel value" refers to a bark product which is improved for combustion in comparison to the raw bark. The bark product with enhanced fuel value has more or less the same energy value, but has enhanced dry weight and sulphur content, which is positive from combustion point of view, and decreased chlorine content, which is important since it lower the risk of incrusts during combustion.

As used herein, the term "astringency" of the tannic product refers to the astringency measured according to ISO 5403-2:2011

BRIEF DESCRIPTION OF THE DRAWINGS

The invention will be described in more detail with reference to the appended schematic drawings, which show an example of a presently preferred embodiment of the invention.

DETAILED DESCRIPTION

The present invention will now be described more fully hereinafter with reference to the accompanying drawings, in which embodiments of the inventive method are shown. The present invention may, however, be embodied in many different forms and should not be construed as limited to the embodiments set forth herein; rather, these embodiments are provided for thoroughness and completeness, and to fully convey the scope of the invention to the skilled addressee.

Figure 1:
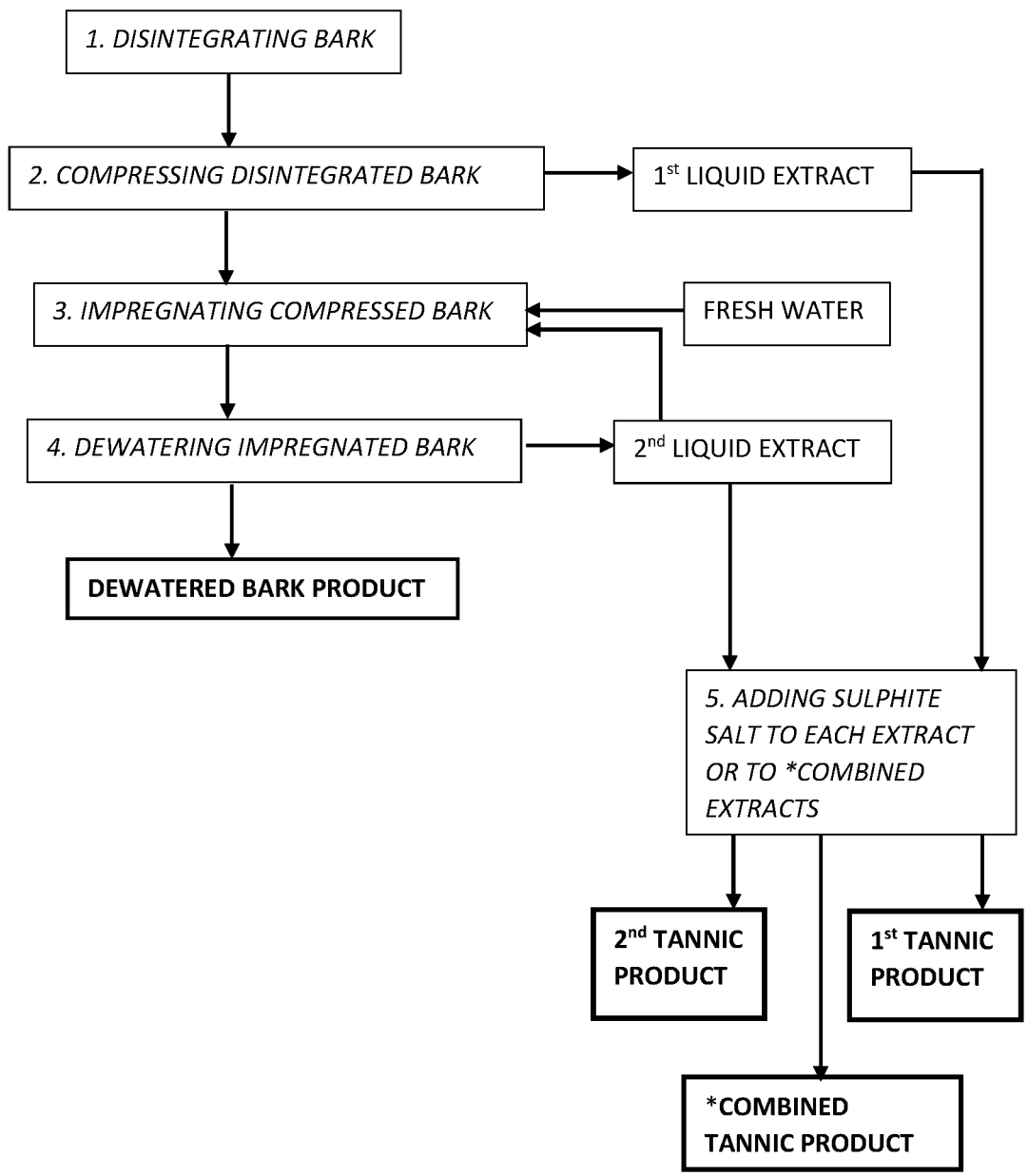
FIGS. 1-12 show process charts of methods according to embodiments of the first aspect of the present invention.
Figure 2:
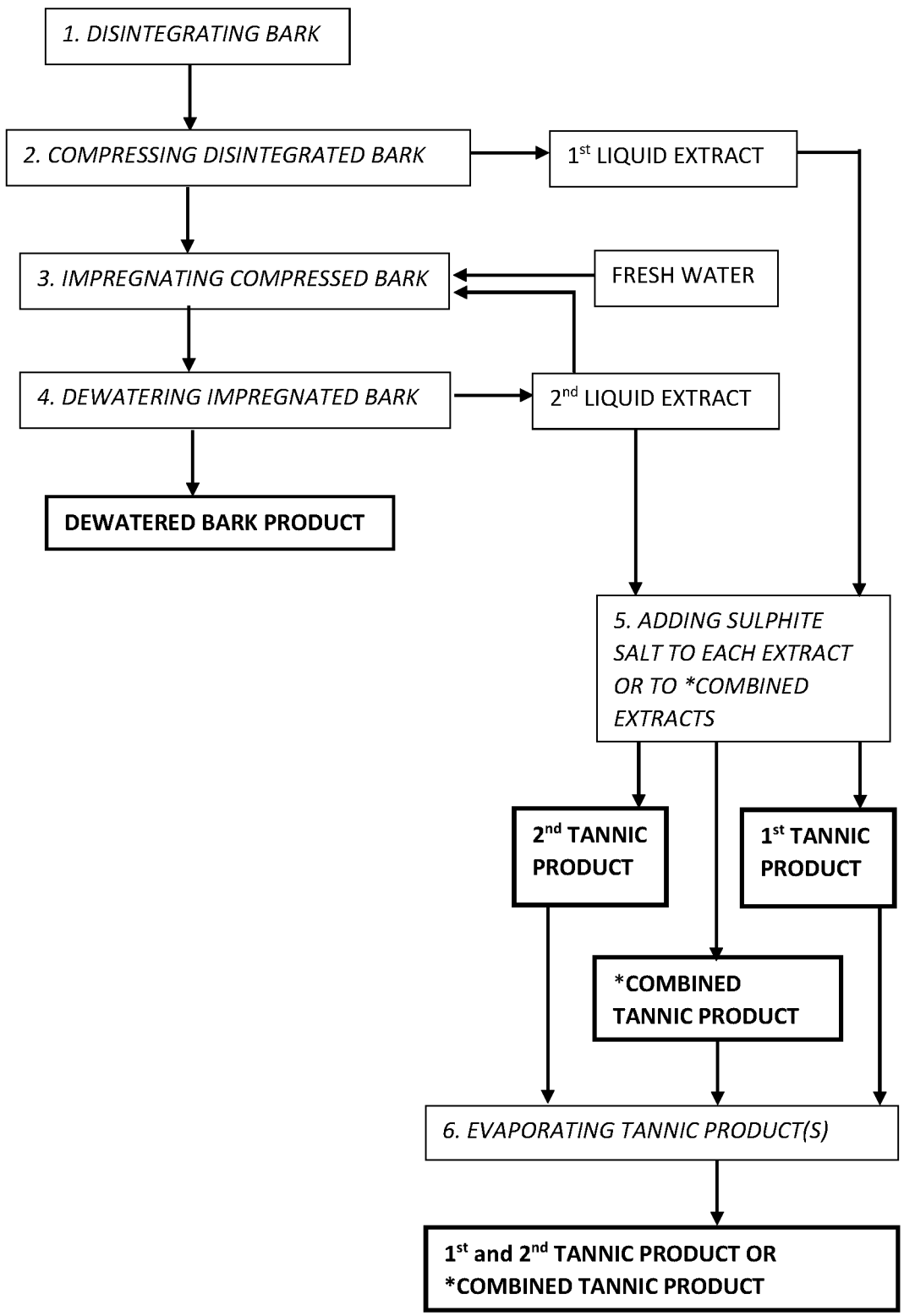
Figure 3:
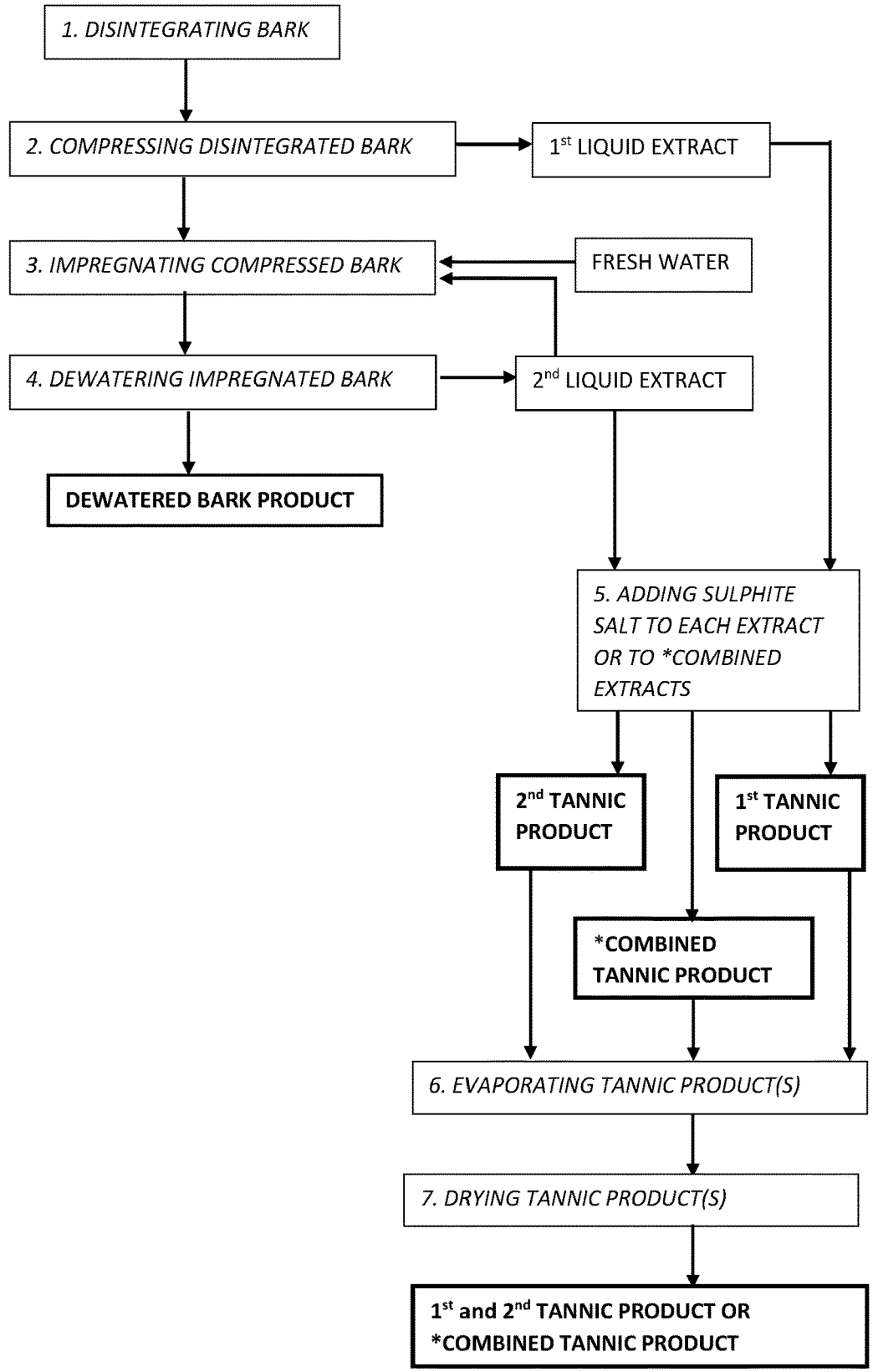
Figure 4:
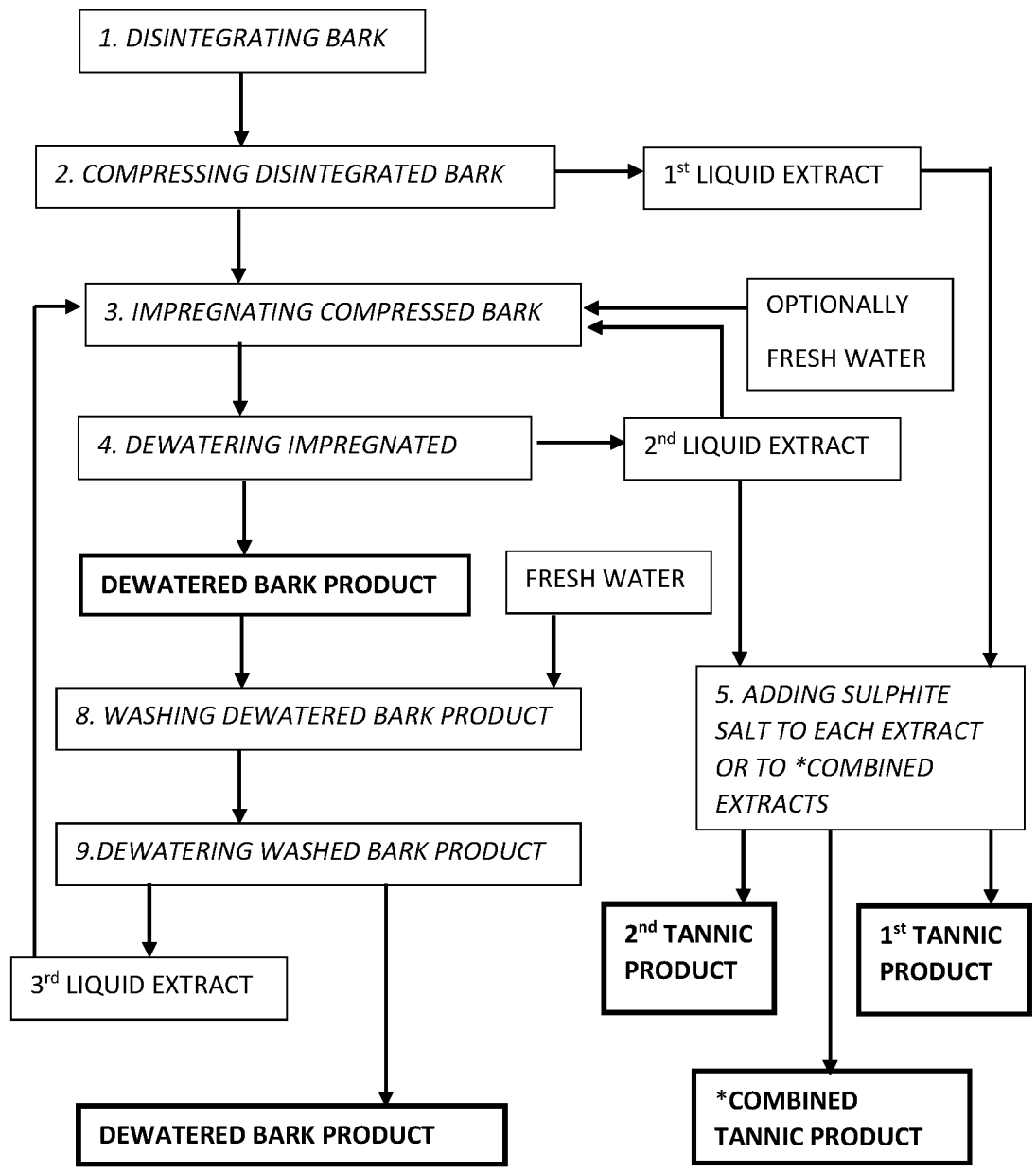
Figure 5:
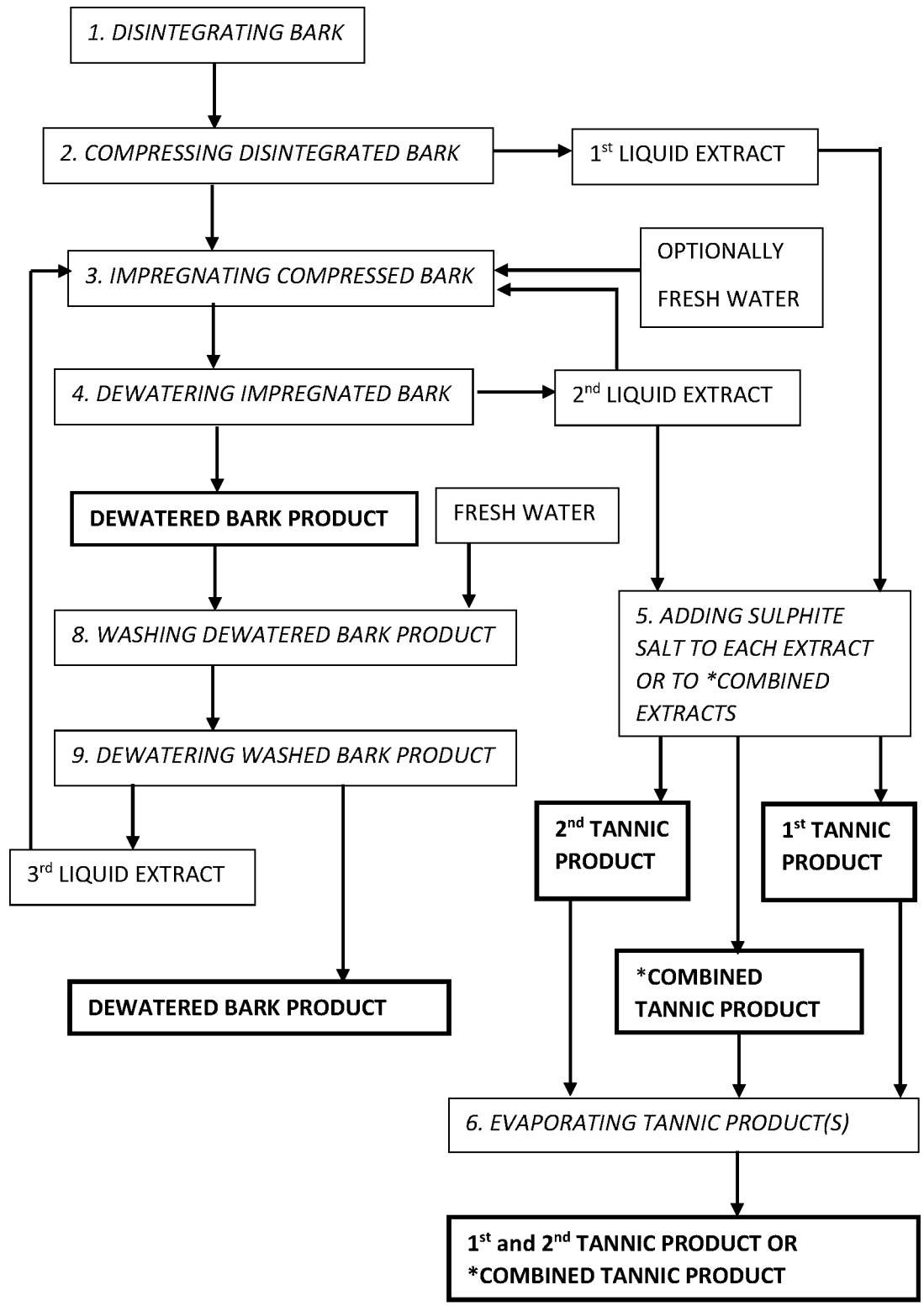
Figure 6:
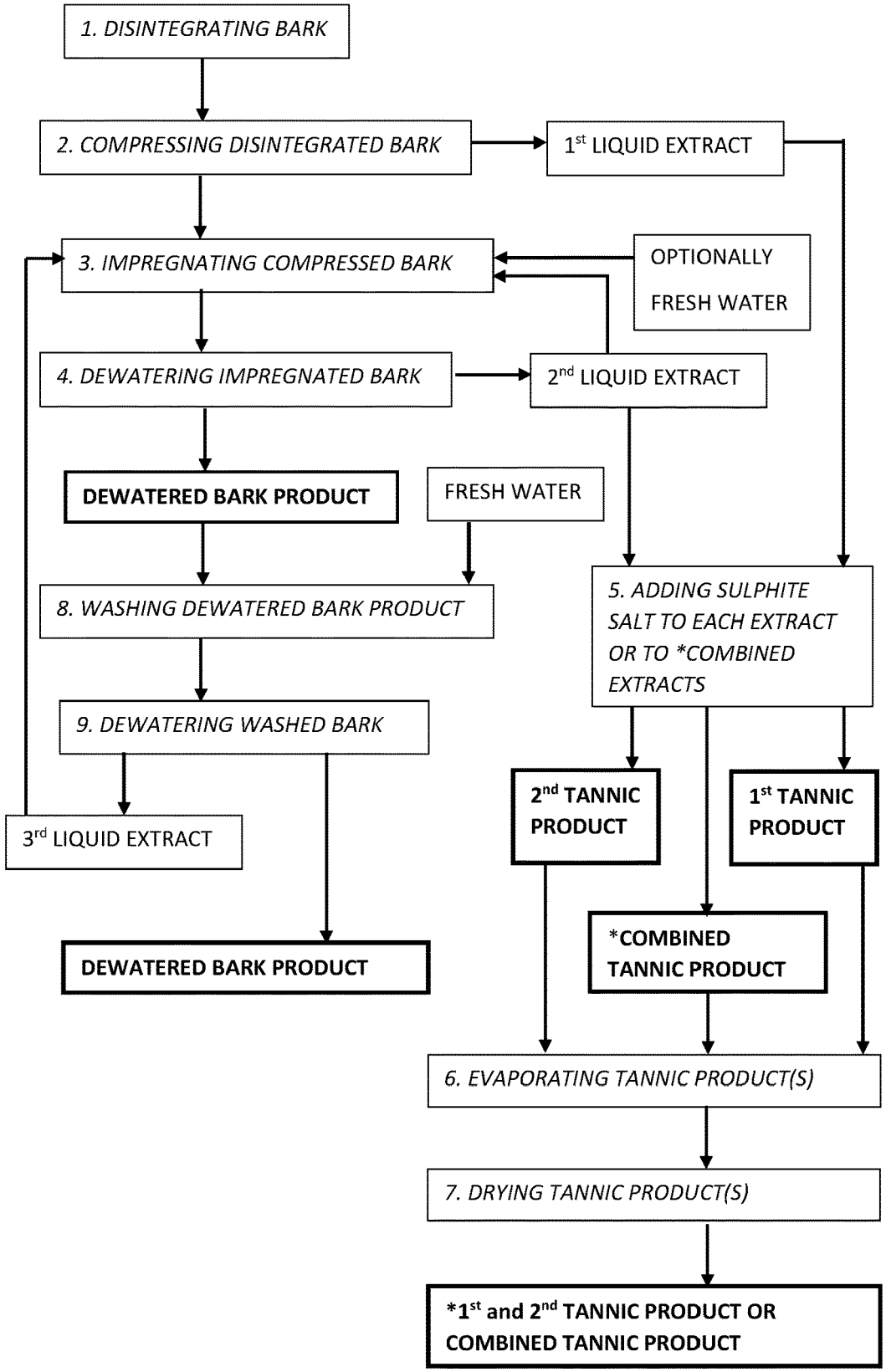
Figure 7:
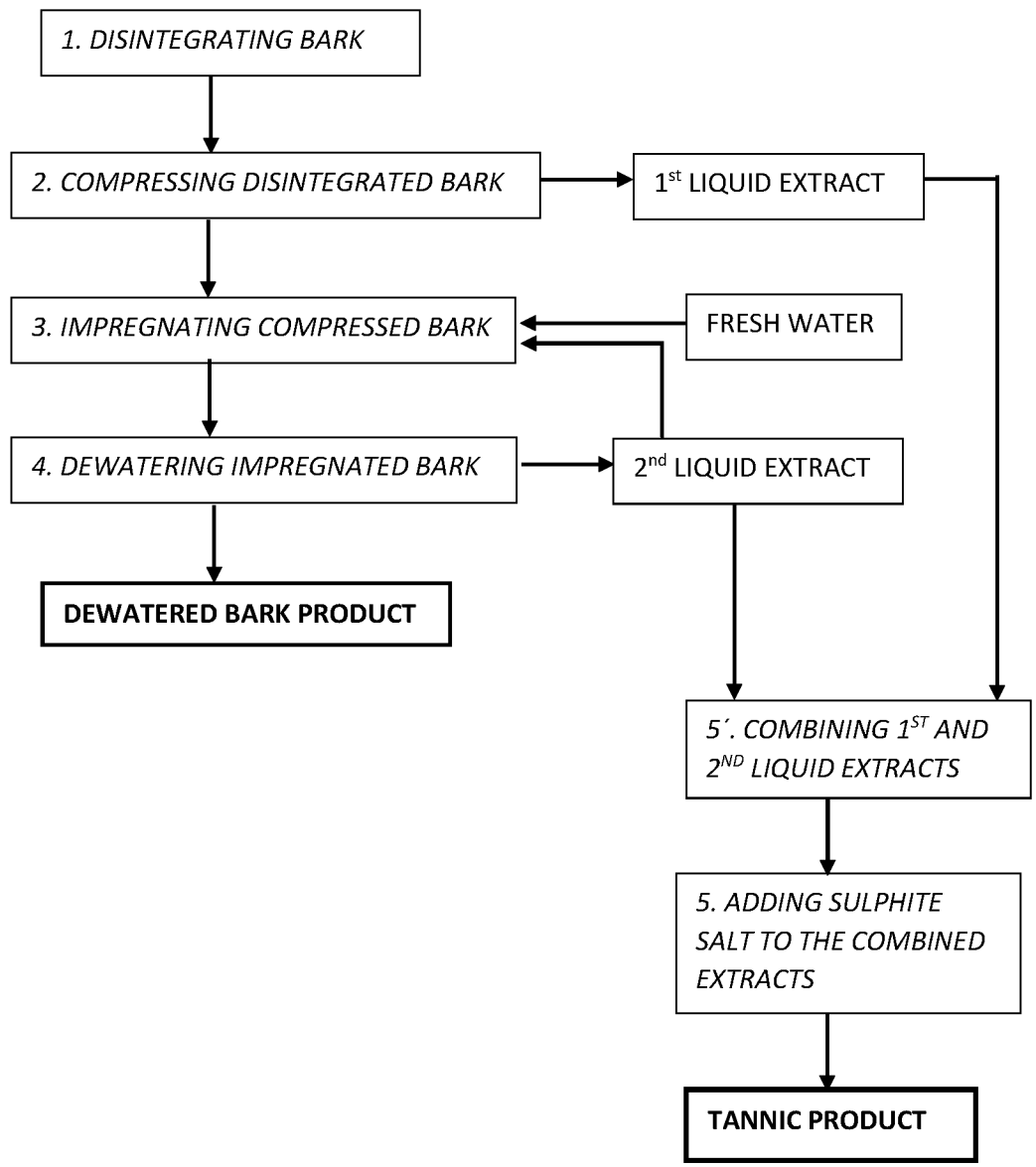
Figure 8:
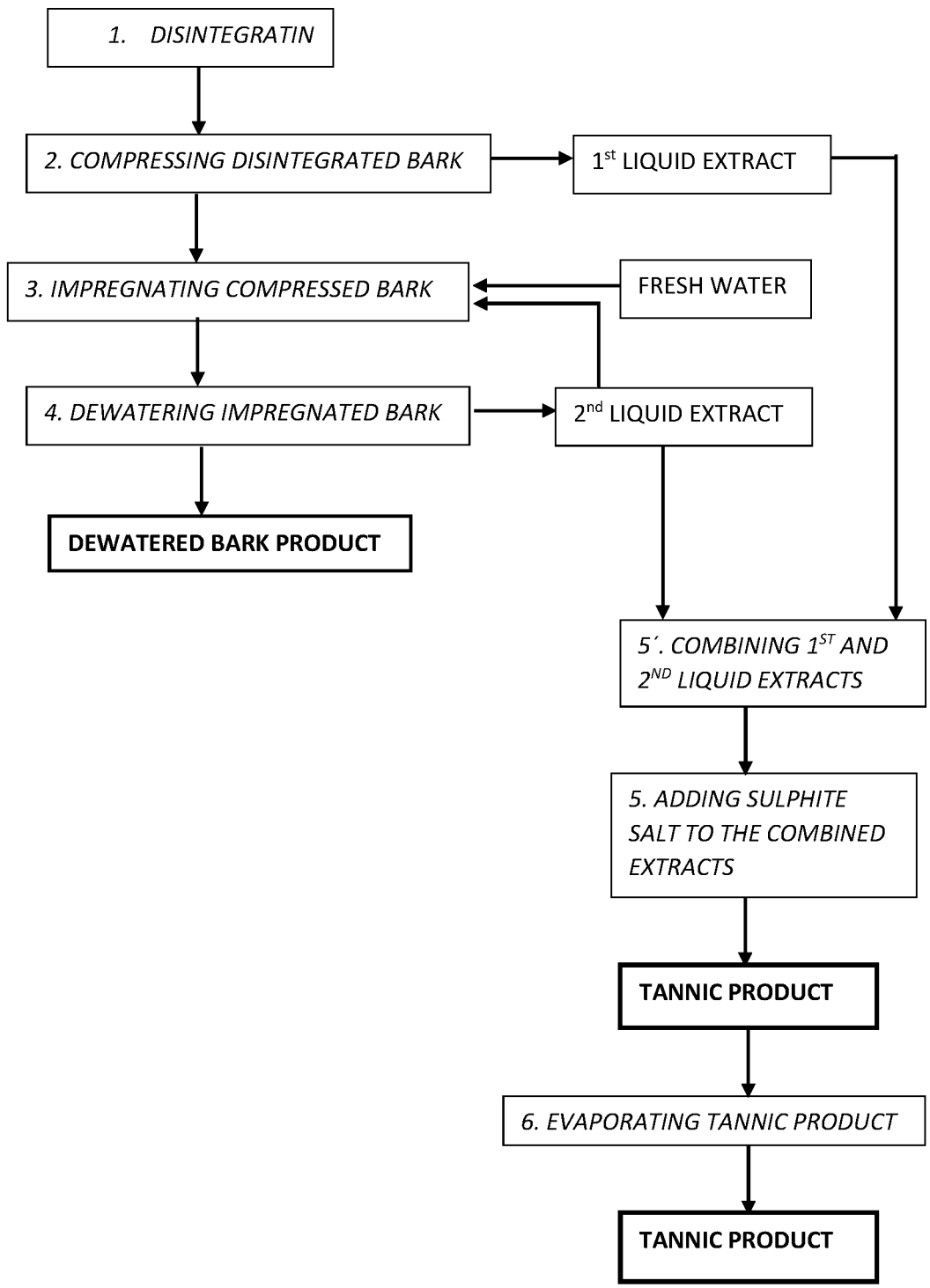
Figure 9:
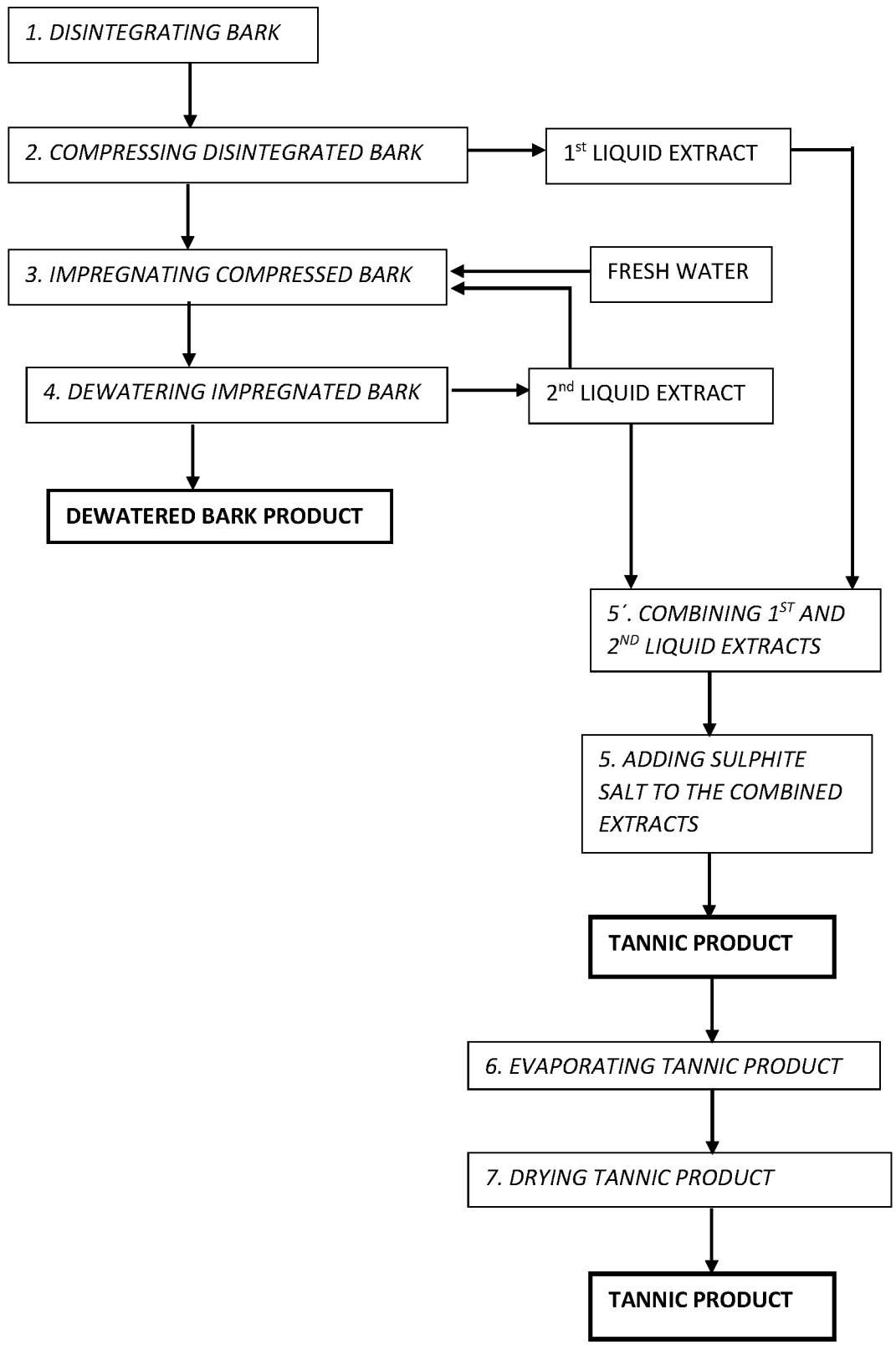
Figure 10:
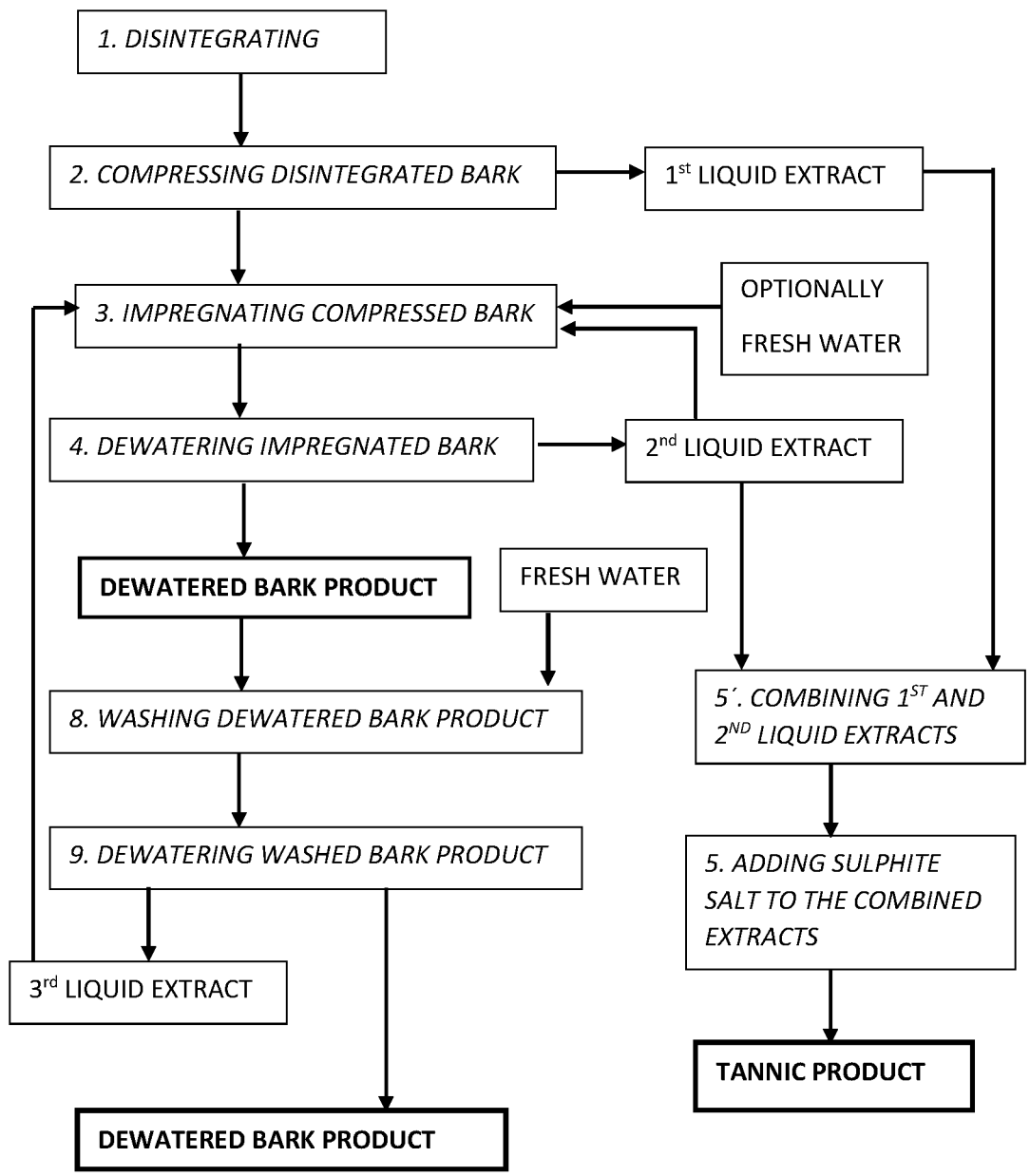
Figure 11:
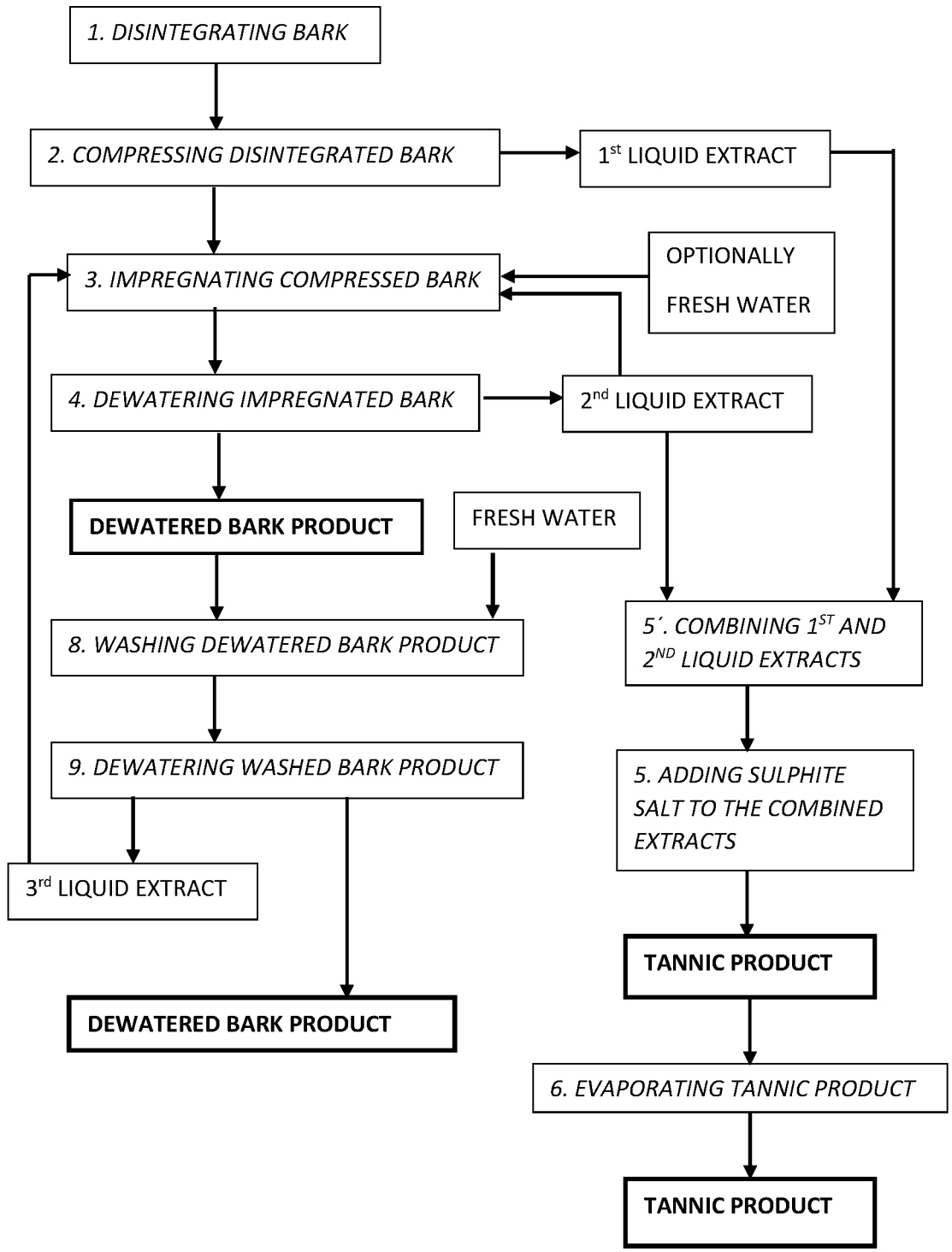
Figure 12:
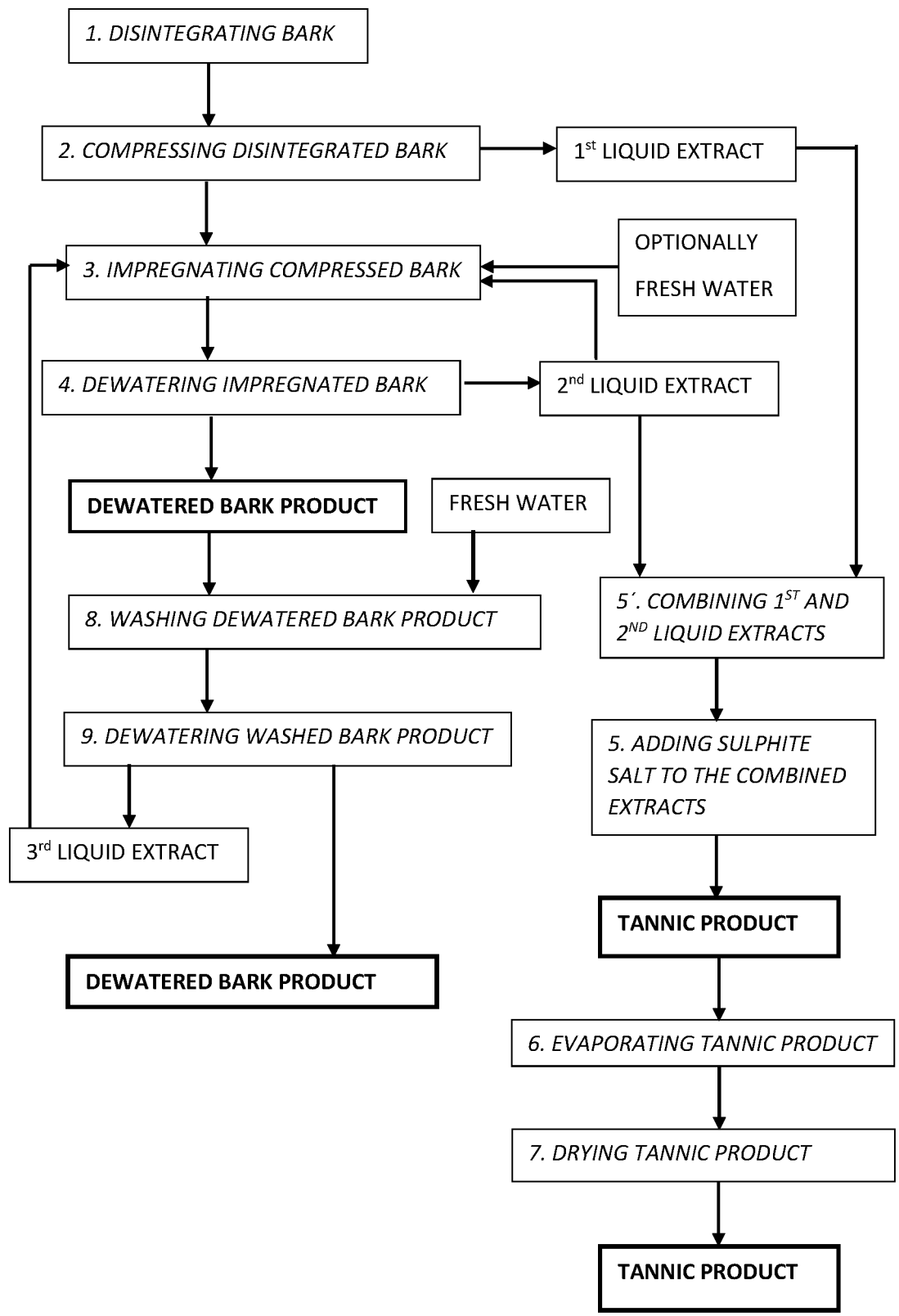

FIGS. 1-12 show different process charts of methods according to embodiments of the first aspect of the invention.

The bark used for the inventive method is a by-product from saw mills or pulp mills. The bark is debarked from the wood logs before the wood logs enter into the processing within the saw mill or the pulp mill.

The first step of the inventive method (which step is common for all FIGS. 1-12) is to disintegrate the bark to a size of 1-200 mm. The dry weight of the bark depends on variety of tree and on varies with season, but the disintegrated bark normally has a dry weight of 15-50%, 20-45% or 25-35%.

The second step of the inventive method (which step also is common for all FIGS. 1-12) is compressing of the disintegrated bark to provide a $1^{st}$ liquid extract and compressed bark. The compression may be performed in a plug screw feeder, in which the $1^{st}$ liquid extract is removed from the disintegrated bark via screw pressure. The compression is made with such a pressure that the bark is compressed to a dry content of 40-60%, 45-55% or 45-50%.

The third step of the inventive method (which step also is common for all FIGS. 1-12) is impregnating the compressed bark with a first aqueous impregnation composition. The impregnation is performed during 10-120 minutes, during 15-60 minutes, or during 15-30 minutes. The temperature during the impregnation is 45-80° C., 50-70° C., or 55-65° C. During the impregnation the pH is below 7, below 6.5 or below 6. The compressed bark and the first aqueous impregnation liquid is, in one embodiment, mixed together at a first lower end of a vertically arranged conveyor screw and then transported upwards within the vertically arranged conveyor screw and discharged over to a retention tank. However, in another embodiment the compressed bark and the first aqueous impregnation liquid may be mixed directly together in a retention tank. The impregnation time period starts as soon as the compressed bark and the first aqueous impregnation liquid are brought in contact. The compressed bark will absorb the first aqueous impregnation liquid rapidly and expand similar to a sponge first being compressed and then brought in contact with liquid. In this way, the first aqueous impregnation liquid will impregnate the bark quickly and deep within the bark.

In a fourth step of the inventive method (which step also is common for all FIGS. 1-12) the impregnated bark is thereafter dewatered to provide a $2^{nd}$ liquid extract and dewatered bark. This dewatering may also be performed with a plug screw feeder as in the second step, but also other dewatering apparatuses are possible, such as screw press in general, desiccator, and so forth.

As shown in the process charts of FIGS. 1-3, 7-9, the dewatered bark obtained in this fourth step is provided as a bark product having an enhanced fuel value in comparison with the bark entering into the method. See table 7 and example 8 below for further details concerning this matter.

The $2^{nd}$ liquid extract provided in this fourth step is partly recirculated to form part of the first aqueous impregnation liquid optionally together with fresh water. In one embodiment the recirculated part of the $2^{nd}$ liquid extract amount to 25-95% of the received $2^{nd}$ liquid extract, but may amount to 40-90%, 50-85%, 60-80%, or about 75% of the received $2^{nd}$ liquid extract. By recirculating a part of the $2^{nd}$ liquid extract, the need for addition of fresh water is lowered. At the same time there is a build-up of dry content in the liquid phase of the bark product.

The proportion of recirculated $2^{nd}$ liquid extract and fresh water may be within the weight ratio range of 1:2-6:1, within the weight ratio range of 1:1-5:1, within the weight ratio range of 1.5:1-4:1, or within the weight ratio range of 2:1-3:1 ($2^{nd}$ liquid extract:fresh water) to provide the first aqueous impregnation composition. The temperature within the impregnation step (step 3) is adjusted with incoming fresh water, but may also be adjusted with heating means within the vertically arranged conveyor screw and/or the retention tank. Such heating means may be heating jackets for the conveyor screw and/or the retention tank, external heat exchanger, direct steam in impregnation step or retention tank, or any suitable immersion heating arrangement within the retention tank.

In a fifth step of the inventive method (which step also is common for all embodiments in FIGS. 1-12) a sulphite salt is added to each extract, i.e. $1^{st}$ and $2^{nd}$ extracts. However, as optionally shown in FIGS. 1-6 and as mandatory shown in FIGS. 7-12, said $1^{st}$ and $2^{nd}$ extract may be or are combined prior to sulphite salt addition (shown as step 5' in FIGS. 7-12). Sulphite salt is added to said extract(s) within a range of 1-25% by weight, within a range of 2-24% by weight, within a range of 4-22% by weight, within the range of 5-20% by weight, or within the range of 10-15% by weight to provide a tannic product. These ranges are given as dry weight sulphite salt versus dry weight tannic product. The sulphite salt may be added to the tannic product as a solution, preferably with more than 10% dry weight, more than 20% dry weight, or more than 30% dry weight.

As shown in the process charts of FIGS. 1, 4, 7, and 10, the tannic product provided in step five is provided as the final tannic product. The tannic product obtained in this step normally has a dry weight of above 2%, above 4%, above 6%, or above 8%.

However, in some embodiments this tannic product obtained in the fifth step may be further processed. In the embodiments shown in FIGS. 2, 3, 5, 6, 8, 9, 11 and 12 the tannic product obtained from the fifth step is further processed in a sixth step of the inventive method. In this sixth step, the tannic product is evaporated to a higher dry weight. In one embodiment the evaporation is made to a degree in which the tannic product has a dry weight of at least 10% by weight, of at least 20% by weight, of at least 30% by weight, of at least 40% by weight, or of at least 50% by weight. During evaporation the temperature may preferably be below 100° C., below 90° C., below 80° C., or below 70° C. As shown in the process charts of FIGS. 2, 5, 8 and 11, the tannic product obtained by this sixth step is the final tannic product. This evaporation may be performed with any type of evaporator, e.g. falling film evaporator, rising film evaporators, thin film evaporators, etc. in one embodiment a falling film evaporator is used.

However, in even some further embodiments this tannic product obtained after this sixth step may be further processed. In the embodiments shown in FIGS. 3, 6, 9, and 12 the tannic product obtained from the sixth step is further processed in a seventh step of the inventive method. In this seventh step the tannic product coming from step six is dried for providing a dry powder product of said tannic product(s). The drying may be spray drying or freeze drying. In one embodiment the drying is spray drying, and in one embodiment the spray drying includes agglomeration of particles. During spray drying the temperature of in-coming air may have a temperature within the range of 150-250° C., or within the range of 180-220° C., and out-coming air may have a temperature within the range of 75-100° C., or within the range of 80-95° C. In one embodiment the dry powder product has a moisture level below 10%, below 5% or below 3%.

To further enhance the fuel value of the dewatered bark product obtained after the fourth step, the dewatered bark product may be washed once more with an aqueous solution in an eight step, and thereafter dewatered in a ninth step as shown in FIGS. 4-6, and FIGS. 10-12.

This dewatering in the ninth step may also be performed with a plug screw feeder as in the second step, but also other dewatering apparatuses are possible, such as screw press in general, desiccator, and so forth.

The dewatered bark product obtained from the ninth step has a higher fuel value than the dewatered bark product obtained from the fourth step, for further details see below in table 7, example 8.

A $3^{rd}$ liquid extract is also obtained when performing the dewatering of the ninth step, and this $3^{rd}$ liquid extract is recirculated back to the third step of impregnation, wherein this $3^{rd}$ liquid extract is combined with the recirculated part of the $2^{nd}$ liquid extract optionally together with the fresh water. The third liquid extract replaces a substantially part of the fresh water in the first aqueous impregnation composition. In one embodiment the proportions of second liquid extract to third liquid extract optionally combined with fresh water are within the weight ratio range of 1:4 to 20:1, the weight ratio range of 1:2 to 10:1, the weight ratio range of 1:1 to 5:1, the weight ratio range of 1.5:1 to 4:1, or the weight ratio range of 2:1 to 3:1.

Concerning the third liquid extract optionally combined with fresh water, in one embodiment more than 70% are made up by the third liquid extract (thus less than 30% of fresh water is added). In another embodiment more than 80% are made up by the third liquid extract (thus less than 20% of fresh water is added). In another embodiment more than 90% are made up by the third liquid extract (thus less than 10% of fresh water is added). In yet another embodiment 100% are made up by the third liquid extract (thus no fresh water is added).

EXAMPLES

The present invention will now be illustrated by way of non-limiting examples in order to further facilitate the understanding of the invention and provide information about the different test models used when investigating the properties of the tannic product and the bark product.

Example 1

Pilot Plant Extraction and Tanning

Spruce bark (thinning quality) from a pulp mill was debarked from the wood logs and disintegrated with a pilot disintegrator to an average size of 50 mm. Extraction was performed in a pilot equipment comprising a chip bin, a plug screw feeder, an impregnator, a retention vessel and transportation screws in between.

The spruce bark of 30% dry content was added to the chip bin in which steam addition was possible. From the bottom of the chip bin, the bark was fed by a transport screw to the plug screw feeder, PSF, in a rate of approximately 54 kg/h calculated as dry weight. Therein excess fluid and additional fluid was separated from the bark to a bark dry content of 45%. The separated fluid, which is the first extract, was collected below the PSF. The bark was further transported to an impregnation step, in which fresh water was added in a weight ratio of about 1:6 (dry bark:water). The temperature was approximately 75° C. Vertical transporting screws lifted the bark up to the top of the impregnation step and horizontally over to the top of the retention vessel, from which bottom the impregnated bark was transported and collected in containers. After 60 minutes of residence time, during which the temperature dropped to approximately 65° C., the bark was replaced in the chip bin and a second extract from the PSF was collected. The bark leaving the retention vessel was also collected. After plane screening and filtering through a 100 µm filter, the pure or 50:50 ratio mix extracts (mixture of first and second extract) were spray dried in a lab spray drying equipment, using an incoming temperature of 180° C. and an outgoing temperature of 85-90° C. The feed flow was 10 ml/min and the yield 75%.

Three different trials were made. The first trial was made without steam addition into chip bin and without sodium bisulphite added to the impregnation step. The second trial was made with steam addition into chip bin and without sodium bisulphite added to the impregnation step and the third trial was made without steam addition into chip bin but with 50 kg/t sodium bisulphite based on dry bark added to the impregnation step. Separate additions of 2 g/l of sodium bisulphite to the extracts were made in test No:s 1-6.

It was more difficult to run the process when steam was added to the bark, since then the entrance to the transport screw was constantly plugged and needed to be manually feed.

The final powders were analyzed for tannin content by using a spectrophotometric method. The method is based on an oxidative degradation of the tannin to red antocyanidine, which is quantified by absorbancy at the wave length of 550 nm. Two solutions were prepared, one made by 950 ml n-butanol mixed with 50 ml concentrated hydrochloric acid and one made by diluting 16.6 ml concentrated hydrochloric acid to 100 ml by water, followed by an addition of a ferric ammonium sulphate which has been dissolved in 25 ml 2N hydrochloric acid. In a test tube, 6 ml of n-butanol solution and 1 ml of powder sample dissolved in water (1 g/liter) was added. After shaking, 0.2 ml of the second solution containing iron(III) was added. The test tubes were kept in boiling water bath for 60 min, then absorbancy was measured by UV-VIS spectrophotometer, Shimadzu UV-1201, and calibrated against a reference (mimosa tannin).

For the lab tanning trials, seven pieces of approximately 5 cm×5 cm cow hide were added to seven separate small baths containing the tanning agent diluted with water to 40% concentration. For the tanning trials, 50 g of dry tanning agent was used for 100 g of cow hide.

Preparation of extracts, their tannin contents and tanning effects are presented in table 1 as test No:s 1-7.

TABLE 1

| Test | Steam addition | Extraction step No. | Extract dry content (%) | Sodium bisulphite addition | Tannin content (%) | Tanning effect (scale 1-5) |
|---|---|---|---|---|---|---|
| 1 | No | 1 | 4.5 | Separate | 47.7 | 5 |
| 2 | No | 2 | 2.2 | Separate | 66.2 | 4 |
| 3 | No | 1 + 2 mix | 3.4 | Separate | 55.3 | 4 |
| 4 | Yes | 1 | 4.4 | Separate | 53.4 | 2 |
| 5 | Yes | 2 | 2.4 | Separate | 63.6 | 3 |
| 6 | Yes | 1 + 2 mix | 3.4 | Separate | 57.2 | 2 |
| 7 | No | 2 | 4.1 | In process | 58.1 | 2 |

Separate addition of sodium bisulphite to extract from extraction step 2, was beneficial compared to the reference, which had sodium bisulphite added in the process. The leather tanning effect was better if there was no steam added in the process. The tannin content was not crucial for the tanning effect.

Example 2

Bark Evaluation

Analyses of the energy values of the bark from Example 1, were made with the Eurofins method (SS-EN 14918: 2010). The results are shown in table 2.

TABLE 2

| Test | Bark type | Energy value dry (MWh/t) |
|---|---|---|
| 1 | Before extraction | 5.747 |
| 2 | From 1st trial | 5.565 |
| 3 | From 2nd trial | 5.565 |
| 4 | From 3rd trial | 5.313 |

As is evident from the table above, the energy value of dry bark was higher for the trials without sodium bisulphite added to the process. Evidently the bark from the processes without addition of sodium bisulphite has a better fuel value compared to the process of test No. 4.

Example 3

Pilot Plant Extraction and Tanning

Pilot production of tannin containing bark extracts were made in a pilot scale equipment described in general in example 1. For this trial the equipment was enlarged for recirculation of the bark extract. Spruce bark from a saw mill was debarked from the wood logs and disintegrated with a pilot disintegrator to an average size of 50 mm. Extraction was performed in a pilot equipment comprising a plug screw feeder, an impregnator, a retention vessel and transportation screws, as well as small tanks and pumps in between. Different process setups were tested, as described in tests No:s 1-6.

The spruce bark of approximately 30% dry content was added at a production of 54 kg/h, dry weight, on a transport band to the plug screw feeder (PSF). Therein excess fluid and additional fluid was separated from the bark to a bark dry content of 45%. The separated fluid, which is the first extract, was collected below the PSF with a temperature of around 30° C., and was either fully recirculated or not recirculated to the impregnation step. The bark was further transported to an impregnation step, in which extraction liquid, consisting of fresh hot water and/or recirculated extract, was added in a ratio of ca 1:5 (bark:extraction liquid) at a temperature of approximately 80° C. Vertical transporting screws lifted the bark up to the top of the impregnation step and horizontally over to the top of the retention vessel in which the temperature was 60-65° C. The retention time of the retention vessel was 30 minutes. The bark was dewatered by a dewatering device and transported to a storage, where samples were taken out. The second extract from the dewatering device had a temperature of around 50° C., and was either recirculated or not recirculated to the impregnation step. If the second extract was recirculated, a minor flow of approximately 25% of the second extract was produced. After bow screening (Reko, 150 µm), sedimentation and filtration over a 100 µm filter the first extracts and the second extracts were produced. A separate addition of 5% w/w calculated on dry extract weight was made unless in the case of Test No. 3, where sodium bisulphite was added in a level of 50 kg/t per dry bark weight with the hot water. Spray drying was made according to example 1 and tanning of cow hides was made according to example 2. The tannin content was measured with the spectrophotometric method according to example 1. The sum of the non-tanning and tanning parts of the extract is the total soluble substance and the rest (up to 100%) is non-soluble. The astringency is the ratio of tanning part over non-tanning part and was measured according to ISO 5403-2:2011.

Preparation of extracts is presented in table 3 as test No:s 1-6, and their tannin contents and tanning effects are presented in table 4 as test No:s 1-6.

TABLE 3

| Test | Process type/ Recirculation | Extract number | Recirculation of extract | Extract dry content (%) | Sodium bisulphite addition (%) |
|---|---|---|---|---|---|
| 1 | Open | 1 | — | 3.49 | 5 |
| 2 | Open | 2 | — | 1.74 | 5 |
| 3 | Open | 2 | — | 2.71 | — |
| 4 | Co-current | 2 | First | 1.94 | 5 |
| 5 | Co- and counter-current | 2 | First and second | 2.40 | 5 |
| 6 | Counter-current | 2 | Second | 1.70 | 5 |

TABLE 4

| Test | Tannin content (%) | Tanning part (%) | Non-Tanning part (%) | Astringency |
|---|---|---|---|---|
| 1 | 53 | 48.5 | 33.1 | 1.5 |
| 2 | 47 | 42.4 | 31.9 | 1.3 |
| 3 | 40 | 26.0 | 56.8 | 0.5 |
| 4 | 46 | 40.8 | 34.1 | 1.2 |
| 5 | 44 | 38.7 | 33.3 | 1.2 |
| 6 | 61 | 46.2 | 24.0 | 1.9 |

Evidently the first extract 1 from the open process and the second extract of the counter-current process, gave the best extracts based on tannin content, tanning part and astringency.

Example 4

Pilot Extraction

Pilot production of tannin containing bark extracts were made in a pilot scale equipment described in general in example 1. For this trial the equipment for counter current recirculation of the extract was used. Spruce bark (thinning quality) from a pulp mill was debarked from the wood logs and disintegrated with a pilot disintegrator to an average bark size of 50 mm.

The spruce bark of approximately 30% dry content was added at a production of 60 kg/h, dry weight, on a transport band to the plug screw feeder (PSF). Therein excess fluid and additional fluid was separated from the bark to a bark dry content of 45%. The separated fluid, which is the first extract, was collected below the PSF with a temperature of 21.7° C. and pH 4.1 and a flow of 84 kg/h.

The bark was further transported to an impregnation step, in which extraction liquid, consisting of fresh hot water and recirculated extract, was added in a ratio of 1:4 (bark:extraction liquid) at a temperature of approximately 60° C. The ratio of fresh hot water to recirculated extract was about 1:2. Vertical transporting screws lifted the bark up to the top of the impregnation step and horizontally over to the top of the retention vessel. The retention time of the retention vessel was 30 minutes. The bark was dewatered by a dewatering device and transported to a storage, where samples were taken out. The second extract from the dewatering device had a temperature of 41.5° C. and a pH of 4.2, and was to a major part (74%) recirculated to the impregnation step. After bow screening (Reko, BG300L, 150 μm), sedimentation and filtration over a 100 μm filter (Christian Berner, TopLine TBF0101), the first extract and the second extract was produced in a 50:50 ratio at a rate of 159.6 kg/h with a concentration of 4.7% and pH 4.2.

Example 5

Bisulphite Addition

Six samples of approximately five litres each of 4.7% extract, prepared according to example 4, were collected and sodium bisulphite was added in levels from 0 to 25% w/w based on dry extract. The samples were then separately spray dried under the same conditions in a lab spray dryer (according to example 1) and the tannin content was measured by a spectrophotometric equipment (described in example 1). The results are shown in table 5 below.

TABLE 5

| Test | Added sodium bisulphite (%) | Tannin content (%) | Sample |
|------|------------------------------|---------------------|--------|
| 1 | 0 | 64 | A |
| 2 | 5 | 62 | B |
| 3 | 10 | 62 | C |
| 4 | 15 | 56 | D |
| 5 | 20 | 55 | E |
| 6 | 25 | 52 | F |

Example 6

Preparation of Hides

The raw cow hides to be used for tanning, were prepared by the following procedure during four days:
1. The raw hides were rehydrated and desalted for 24 hours.
2. Hair and natural fats were removed by tensides, calcium carbonate (lime) and sodium sulfide.
3. The hides were washed, cleaned on the meat side and then splitted to the right thickness, after which they were resting in water and calcium carbonate, i.e. a liming stage.
4. Deliming of the hides, followed by washing and pickling (pH 4).

Example 7

Lab Tanning

For the lab tanning trials, six pieces of approximately 5 cm×5 cm from the same hide, prepared according to example 6, were added to six separate small baths containing the tanning agent diluted with water to 50% concentration. For the tanning trials, 50% w/w of dry extract was added per hide weight. The results are shown in table 6.

TABLE 6

| Test | Added sample | Hide weight (g) | Sample weight (g) | Tanning, 1 week (scale 1-5) | Tanning 2 weeks (scale 1-5) | Color of tanned leather |
|------|--------------|-----------------|-------------------|------------------------------|------------------------------|--------------------------|
| 1 | A | 42 | 21 | 3 | 5 | Dark |
| 2 | B | 53 | 27 | 3 | 3 | Yellow tone |
| 3 | C | 43 | 22 | 5 | 4 | Good |
| 4 | D | 40 | 20 | 4-5 | 5 | Good |
| 5 | E | 43 | 22 | 2-3 | 3 | Good |
| 6 | F | 48 | 24 | 1-2 | 4 | Good |

It is clear from the lab tanning tests that optimum quick and final tanning effect as well as accepted color of the final tanned leather, can be reached with samples C and D, i.e. at a sodium bisulphite addition of 10-15% w/w based on dry bark extract.

Example 8

Bark Evaluation

Analyses of bark resulting from Example 4 were made according to Eurofins Energy package (SS-EN 14918:2010, SS-EN ISO 16994:2015 and SS-EN ISO 16994:2015 mod).

In an additional embodiment of example 4, an additional washing step was added. The extracted bark was mixed with hot water in a mixer, dewatered by a dewatering device and the bark extract was recirculated counter-current in the process to the impregnator, substituting the hot water previously added in that position. The results are shown in table 7 below.

TABLE 7

| Test | Bark type | Dry content (%) | Energy value dry, ash free (MWh/t) | Sulphur content (% dry solids) | Chlorine content (% dry solids) |
|------|-----------|-----------------|-------------------------------------|---------------------------------|----------------------------------|
| 1 | Prior to extraction | 30.8 | 5.62 | 0.051 | 0.048 |
| 2 | Extracted | 40.5 | 5.61 | 0.079 | 0.024 |
| 3 | Extracted & dewatered | 42.0 | 5.53 | 0.088 | 0.012 |

As is evident from the table above, the energy value decreased, but only below 1% and 2%, when extracted or extracted and dewatered, respectively. At the same time the dry content and sulphur content increased, which is positive from a combustion point of view. The chlorine content decreased, which is important since it will lower the risk of incrusts during combustion. Thus, a bark product with enhanced fuel value is provided by the method according to the present invention.

Example 9

Pilot Drying

The pilot extraction of example 4, was run continuously for 52 h. The yield after filtration was 8.3%, excluding the addition of 15% w/w sodium bisulphite added on basis of dry extract. The pilot drying was performed in two steps; evaporation and spray drying.

The evaporation was made in a two-effect falling film evaporator equipment, at a temperature of 60-70° C., to a dry content of first approximately 20% after the first effect and finally 50.8%. The yield in the evaporator step was 88%.

The spray drying was made in a pilot fluidized spray dryer, using an incoming temperature of 200° C. and an outgoing temperature of 92-94° C. The feed flow was 35-36 kg/h and the yield was 94%.

The final agglomerated spray dried powder had excellent quality, with very quick solubility in water, acceptable moisture content around 4% and the best tanning efficiency ever received with spruce bark tannin according to a tannery. The hides were prepared according to example 6.

The overall production yield was 6.8%, excluding sodium bisulphite and 7.8% when including sodium bisulphite. The tannin content was in average 52% (6 samples), measured according to example 1.

The skilled person realises that a number of modifications of the embodiments described herein are possible without departing from the scope of the invention, which is defined in the appended claims.

The invention claimed is:

1. A method for production of at least one tannic product and a bark product having enhanced fuel value comprising the steps of:
    (a) disintegrating bark to an average bark particle size of 1-200 mm;
    (b) compressing the disintegrated bark to recover a first liquid extract comprising tannic substances;
    (c) impregnating the compressed bark with a first aqueous impregnation composition during 10-120 minutes, at a pH below 7, and at temperature within the range of 45-80° C.;
    (d) dewatering the impregnated bark to recover a second liquid extract comprising tannic substances and a dewatered bark product;
    (e) recirculating at least a part of the second liquid extract to the impregnation step, wherein the first aqueous impregnation composition comprises a mixture of said recirculated part of the second liquid extract and optionally fresh water;
    (f) optionally combining said first liquid extract with the non-recirculated part of said second liquid extract; and
    (g) adding a sulphite salt to said first liquid extract and to said non-recirculated part of said second liquid extract, or to the optionally combined first and second liquid extracts in a level of 1-25% by weight for providing a first tannic product and a second tannic product, or a combined tannic product.

2. The method according to claim 1 further comprising
    (h) evaporating said first tannic product and said second tannic product or said combined tannic product from step (g) to a level of at least 10% dry weight.

3. The method according to claim 2 further comprising
    (i) drying said first tannic product and said second tannic product or said combined tannic product from step (g) or from step (h) for providing a dry powder product of said first tannic product and of said second tannic product or of said combined tannic product.

4. The method according to claim 1, wherein, in step (g), a sulphite salt is added to said first liquid extract and to said non-recirculated part of said second liquid extract, or to the optionally combined first and second liquid extracts within a range of 2-24% by weight.

5. The method according claim 1, wherein the impregnation in step (c) is made during 15-60 minutes.

6. The method according to claim 1, wherein, in step (c), the first aqueous impregnation composition is added to said compressed bark in a weight ratio (bark:first aqueous impregnation composition) within the range of 1:3-1:10.

7. The method according to claim 1, wherein the temperature in step (c) is within the range of 50-70° C.

8. The method according to claim 1, wherein the pH in step (c) is below 6.5.

9. The method according to claim 1, wherein the recirculated second liquid extract is added to fresh water within a weight ratio range (second extract:fresh water) of 1:2-6:1 to provide the first aqueous impregnation composition.

10. The method according to claim 1, wherein said dewatered bark product from step (d) is treated further and is washed with an aqueous solution, and thereafter dewatered to produce a third liquid extract and a washed and dewatered bark product, and wherein said third liquid extract is recirculated to be combined with the recirculated second liquid extract and optionally fresh water to form said first aqueous impregnation composition for step (c).

11. The method according to claim 1, wherein the bark, in step (a), is disintegrated to an average bark particle size within the range of 2-200 mm.

12. The method according to claim 1, wherein said disintegrated bark from step (a) has a dry content of 15-50%.

13. The method according to claim 1, wherein the bark is compressed in step (b) to a dry content of 40-60%.

14. A tannic product obtained by the method according to claim 1.

15. A bark product obtained by the method according to claim 1.

16. The method according to claim 1, wherein in step (g), a sulphite salt is added to said first liquid extract and to said non-recirculated part of said second liquid extract, or to the optionally combined first and second liquid extracts within a range of 4-22% be weight.

17. The method of claim 1, wherein in step (c), the first aqueous impregnation composition is added to said compressed bark in a weight ratio (bark:first aqueous impregnation composition) within the range of 1:4-1:8.

18. The method of claim 1, wherein the pH in step (c) is below 6.

19. The method of claim 1, wherein the recirculated second liquid extract is added to fresh water within a weight ratio range (second extract:fresh water) of 1:1-5:1.

20. A method for production of at least one tannic product and a bark product having enhanced fuel value comprising the steps of:
    (a) disintegrating bark to an average bark particle size of 1-200 mm;
    (b) compressing the disintegrated bark to recover a first liquid extract comprising tannic substances;
    (c) impregnating the compressed bark with a first aqueous impregnation composition for 10-120 minutes, at a pH below 7, and at a temperature within the range of 45-80°;
    (d) dewatering the impregnated bark to recover a second liquid extract comprising tannic substances and a dewatered bark product;
    (e) recirculating at least a part of the second liquid extract to the impregnation step, wherein the first aqueous impregnation composition comprises a mixture of said recirculated part of the second liquid extract and fresh water within a weight ratio range (second extract:fresh water) of 1:2-6:1;
    (f) optionally combining said first liquid extract with the non-recirculated part of said second liquid extract; and
    (g) adding a sulphite salt to said first liquid extract and to said non-recirculated part of said second liquid extract, or to the optionally combined first and second liquid extracts in a level of 1-25% by weight for providing a first tannic product and a second tannic product, or a combined tannic product.

* * * * *